United States Patent [19]

Penney et al.

[11] Patent Number: 4,830,485

[45] Date of Patent: May 16, 1989

[54] CODED APERTURE LIGHT DETECTOR FOR THREE DIMENSIONAL CAMERA

[75] Inventors: Carl m. Penney, Schenectady; Nelson R. Corby, Jr., Scotia, both of N.Y.

[73] Assignee: General Electric Company, Schenectady, N.Y.

[21] Appl. No.: 124,239

[22] Filed: Nov. 23, 1987

[51] Int. Cl.$^4$ .......................... G01C 3/00; G01C 5/00
[52] U.S. Cl. .......................................... 356/1; 250/227
[58] Field of Search .......................... 356/1, 141, 152; 250/227

[56] References Cited

U.S. PATENT DOCUMENTS

| | | | |
|---|---|---|---|
| 3,555,285 | 1/1971 | Irving | 250/203 R |
| 3,858,201 | 12/1974 | Foster | 356/141 |
| 4,150,897 | 4/1979 | Roberts et al. | 356/152 |
| 4,200,787 | 4/1980 | Carson | 250/227 |
| 4,277,170 | 7/1981 | Miles | 356/152 |
| 4,317,991 | 3/1982 | Stauffer | 356/1 |
| 4,645,917 | 2/1987 | Penney et al. | 250/201 |
| 4,687,325 | 8/1987 | Corby, Jr. | 356/1 |
| 4,687,326 | 8/1987 | Corby, Jr. | 356/5 |

Primary Examiner—Stephen C. Buczinski
Attorney, Agent, or Firm—Donald R. Campbell; James C. Davis, Jr.; Paul R. Web, II

[57] ABSTRACT

High speed readout is achieved in a triangulation ranger by a coded aperture light detector which provides a direct digital representation of a range or height position. A light spot reflected from the surface is optically spread into a line segment so it can be shared among a number of light detection channels. The line of light falls on a coded aperture in front of a segmented fiber optic bundle and the light transmitted by each channel is led to a separate photomultiplier or solid state detector. Every coded channel is constructed to give one bit of the digital address of the range position, and a reference light value is obtained from another channel. Background and secondary reflections may be filtered out by focusing light scattered from the surface to a spot and passing it through a slit aperture oriented in the plane of triangulation before being spread to a line segment.

6 Claims, 6 Drawing Sheets $N = 1 + \log_2(8) = 4$

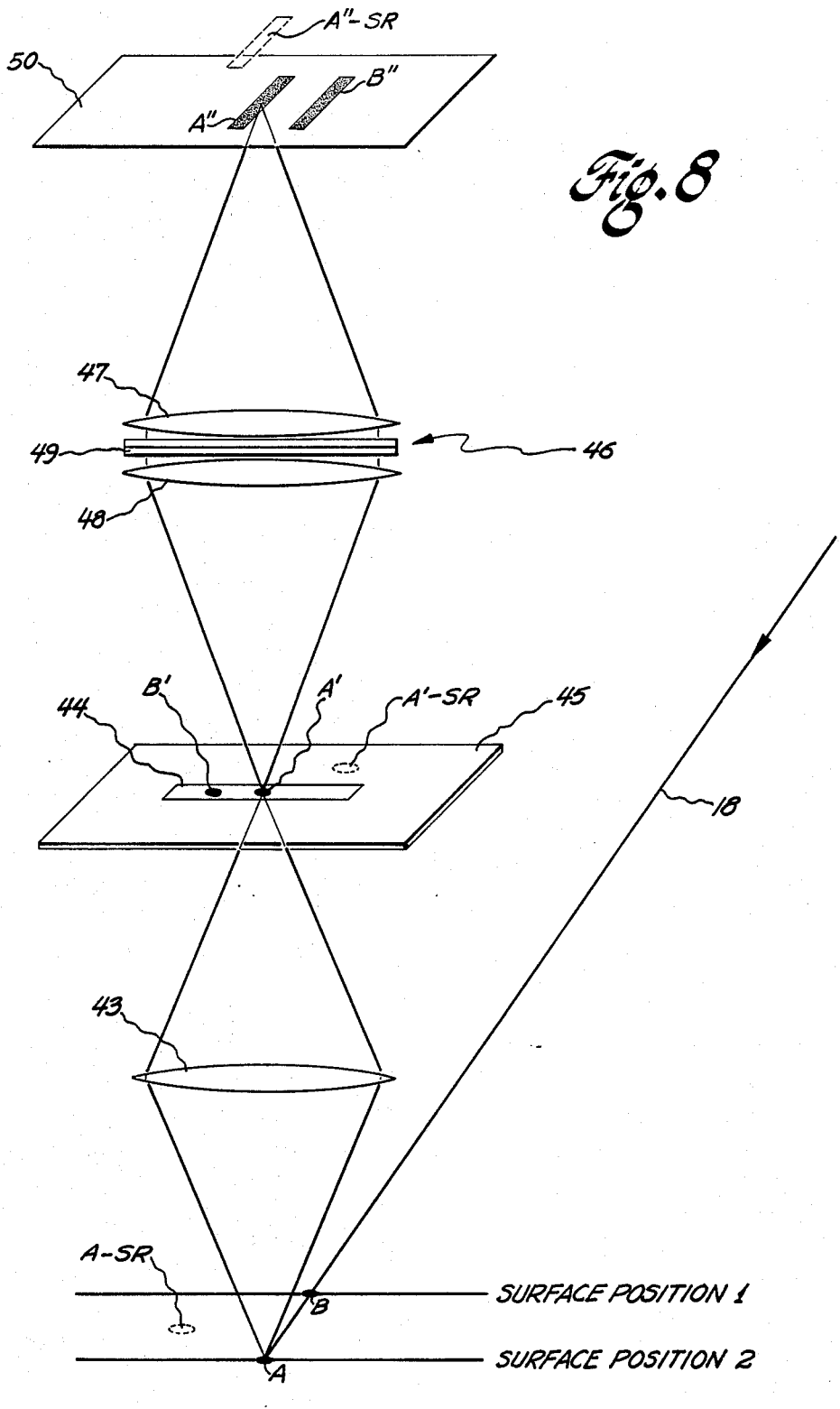

CODED APERTURE LIGHT DETECTOR FOR THREE DIMENSIONAL CAMERA

BACKGROUND OF THE INVENTION

This invention relates to a triangulation range camera and more particularly to a high speed, sensitive wide range coded aperture light detector for these and other systems Devices such as a tree dimensional camera based on triangulation may require measurement speeds up to 10 million range elements (rangels) per second In this application the range measurement is obtained from the position of a spot of bright illumination, often in a varied diffuse background. Spot resolution to at least 8 bits (256 point resolution) typically may be required. Conventional approaches to this problem are summarized below and are too slow or of limited sensitivity, because of detector device limitations and because each range point must be processed sequentially A faster range readout method is needed which preserves the signal verification capabilities of known approaches.

Conventional triangulation range cameras use linear detector arrays, two dimensional arrays, or flying spot configurations. The position of a light spot on a linear array can be determined by reading out each pixel of the array and locating the pixel with the strongest recorded signal, or the center of a peak covering several pixels. If there are 256 pixels and the pixel readout rate is a typical 10 MHz, then 25.6 microseconds is required for a range measurement to a single point and the range measurement rate is 40 kHz, which is a factor of 100 below typical desired rates. A two-dimensional array such as used in CID (charge injection device) and CCD (charge coupled device) TV cameras allows multiple range points to be determined, one from each line of the array, if the light source is a line or a point swept over a line during the array exposure. However the pixel readout rate from a conventional 2-D array is still limited to approximately 10 MHz, providing no advantage in range measurement rate since over 100 pixels must be read to provide a typical range measurement. Furthermore, present solid state cameras are much less sensitive to light, and have much smaller dynamic range than the best available light detectors, e.g. photomultipliers. Since those qualities are also important for robust high speed measurements, solid state detectors should either be improved or replaced for such applications.

The advantages of photomultipliers detectors have been employed in flying spot triangulation rangers, wherein range is determined point by point from the timing of a pulse. One example is U.S. Pat. No. 4,645,917 to Penney, Roy and Thomas. A disadvantage of this approach is that it is slow, because one must wait for the pulse. Range can also be determined by measuring the light spot position using a linear position sensing diode or a photomultiplier pair viewing the spot through density wedges. However, the former is intrinsically slow, limited by detector properties to range data rates much less than 1 MHz for low light level signals. The photomultiplier-density wedge combination can provide range data rates on the order of 10 MHz for the same light levels; it senses the position of the centroid of light illumination rather than the position of the sharp point of light carrying range information. Thus the photomultipliers pair can give substantially incorrect range information whenever there is significant background illumination or secondary scattering from the projected beam. Furthermore, the signals from the density wedge detectors do not provide any signal quality information, which is necessary for good range data from shiny targets. Finally, a signal to noise analysis shows that analog light spot position measuring devices are less efficient than optimum digital equivalents when resolutions better than one part in 64 are required, as in the present case.

SUMMARY OF THE INVENTION

An object of the invention is to provide a new approach to triangulation range systems based on spatial coding of the light distribution which can use photomultipliers or custom solid state detectors to yield excellent sensitivity, dynamic range and data rate.

Another object is an improved triangulation ranging system in a three dimensional range camera that utilizes a coded aperture to provide a direct digital readout of the position of a light spot.

Yet another object is the provision in such a system of enhanced signal quality by indicating a measure of signal accuracy and discriminating against diffuse background and multiple scattering.

One aspect of the invention is an improved ranging system based on triangulation comprised of means to project onto a coded aperture light detecting means, a line segment of light whose position along the coded aperture is related to range to a surface. The light detecting means has a plurality of coded channels which transmit light to separate detectors and the coded aperture at the front of said channels is such as to provide a direct digital representation of the position of the line segment.

Other features are that the photomultiplier or solid state light detectors generate separate electrical signals and these are fed to a vision computer whose outputs are range values. The coded channels according to one arrangement may have a row of clear and opaque cells and there may be a clear reference light value channel. The number N of channels to give a resolution of R range points is $N = 1 + \log_2 R$.

The preferred embodiment of the invention is a system in a three dimensional range camera having means to project a light spot onto a surface whose height is to be measured; optical means to spread a spot of light scattered from the surface into a straight line segment or linear stripe that is incident on all channels of the coded aperture light detector; and wherein the last mentioned is comprised of a plurality of channels each transmitting light to a separate detector device and a spatially coded aperture such that every channel contributes to one bit of the binary address of the light spot height position. A clear reference channel transmits ambient light to another detector device. An important feature is that the channels may be constructed as individual noncoherent fiber optic bundles and the coded aperture is provided by a patterned mask in front of the fiber optic bundles. Another feature is the inclusion in the ranging system of means to filter out background and secondary reflections that may interfere with a correct measurement of height. A lens focuses the light scattered from the surface into a light spot that passes through a slit aperture before being spread by an optical system, typically composed of a combination of spherical and cylindrical lenses, into a line segment that falls on the coded aperture.

BRIEF DESCRIPTION OF THE DRAWINGS

FIG. 8 is a system diagram of another embodiment of the ranging system which includes a slit aperture to filter background and spurious reflections.

DETAILED DESCRIPTION OF THE INVENTION

Figure 1:
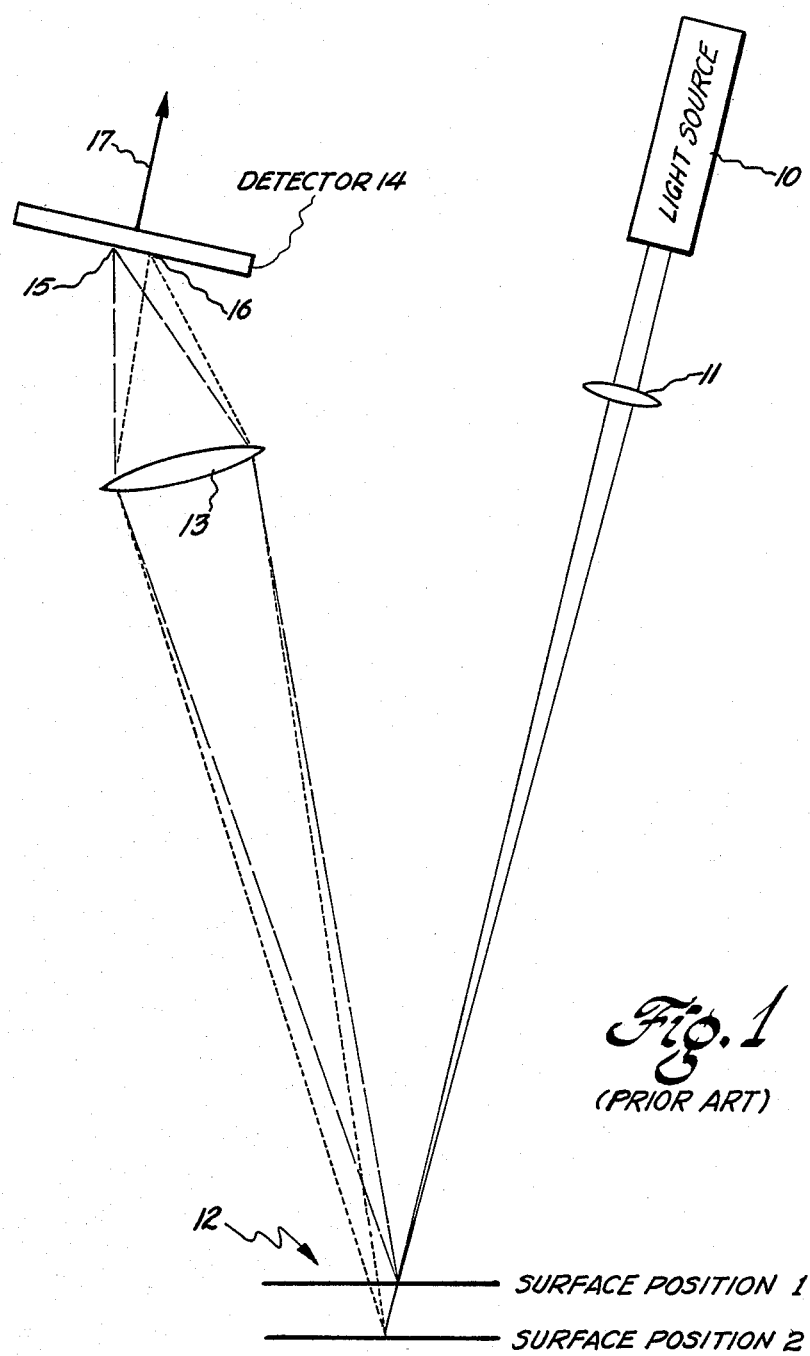
FIG. 1 shows a typical prior art triangulation ranging system.

The invention will be described in terms of a particular implementation. It is assumed that range z to a point is to be measured by triangulation at high speed, such that the point can be scanned rapidly to provide a three dimensional representation of an object. Methods of scanning are not described here because it will be evident to those skilled in the art that the illustrative embodiments can be scanned using known techniques. A typical triangulation ranging geometry is shown in FIG. 1. Range is determined from the position of the light peak caused by focusing light scattered from the transmitted beam by the observed surface. Surfaces at two positions are shown to illustrate the relationship of focal spot position to range. The beam from a collimated light source 10, preferably a laser, is focused by a lens 11 and projected onto the surface 12. Light scattered by the surface is collected by a receiving lens 13 and focused onto a detector 14 which is sensitive to the position of the light spot. The detector surface can be angled to maintain tight focus with changes in range, an application of the Scheimpflug principle which is well known in photographic optics. The light spot from the surface at position 1 is incident on the detector at 15, and the light spot from surface position 2 at 16. A signal containing surface position information is output at 17.

Figure 2:
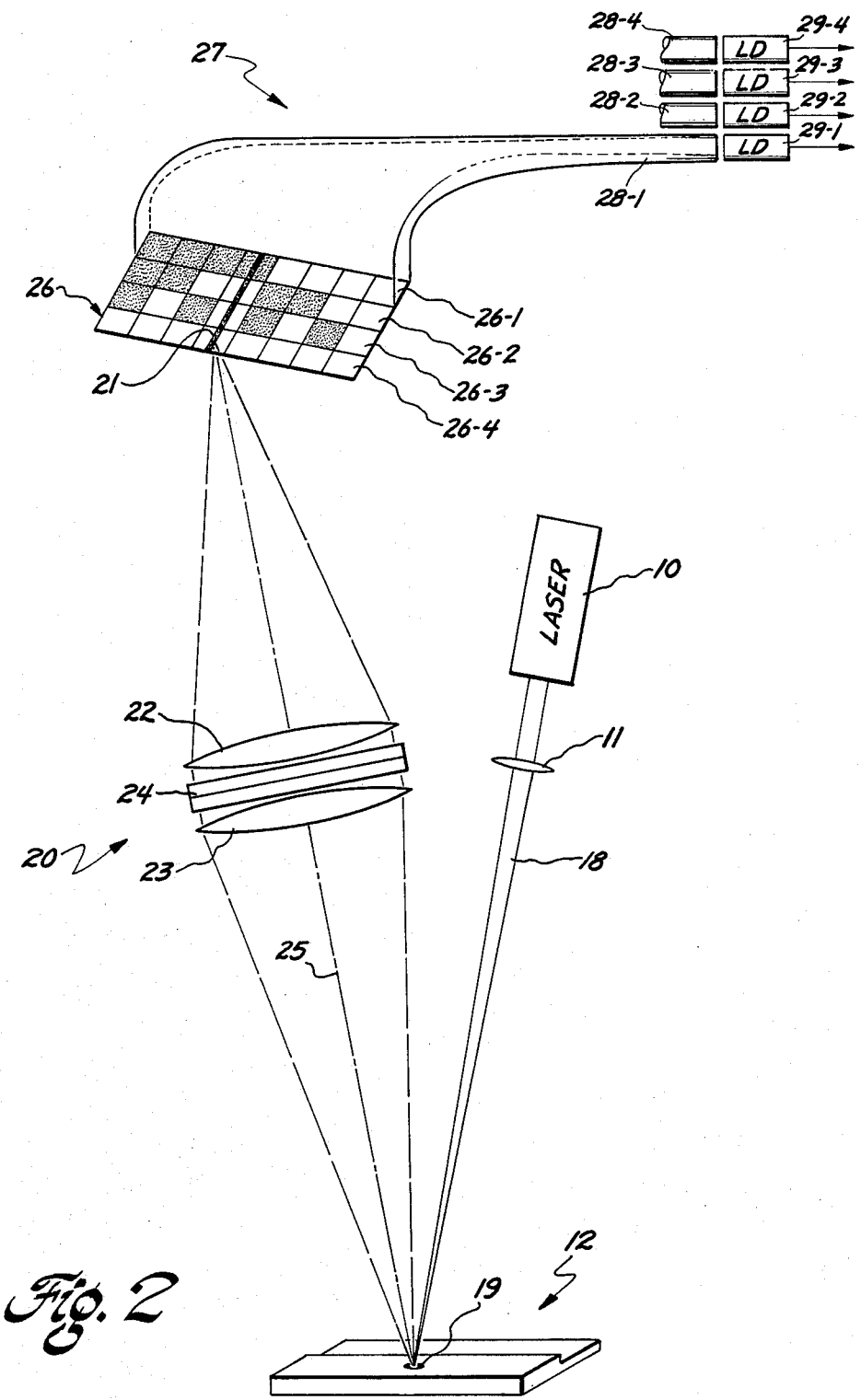
FIG. 2 illustrates one embodiment of a triangulation range system according to the invention having a coded aperture detector
Figure 3:
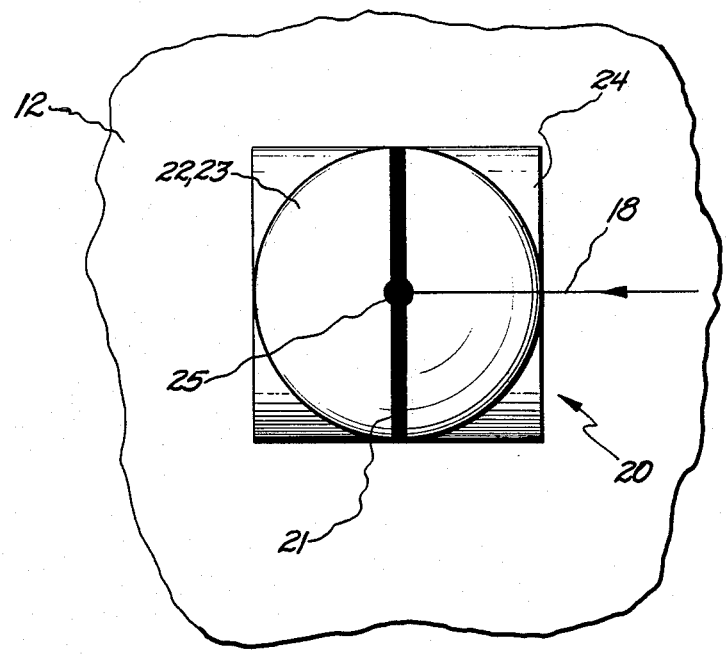
FIG. 3 is a top view of the optics to spread a light spot into a line segment of light.

FIG. 2 illustrates the principles of the present invention. A light beam 18 is projected onto the surface to which height is measured and the light spot 19, instead of being refocused as a light spot that falls on the detector, is spread out by an optical system 20 into a straight line segment 21 perpendicular to the direction of its range-dependent motion, so that the light can be shared among a number of light detection channels. Any optical system may be used, as known to those versed in optics, that expands a small spot of light into narrow, linear light stripe, with nominally uniform intensity along its length and long enough to be incident on all the light detecting channels. This spreading action is accomplished in this figure by a combination of spherical and cylindrical lenses 22–24, and in FIG. 8 by including a cylindrical lenticular plate in the usual focusing lens. FIG. 3 is a top view of spherical lenses 22 and 23 and cylindrical lens 24, showing the relation of line segment 21 of light to the optical system, projected light ray 18, and the optical axis 25 of the receiving lens system. Line segment 21 is perpendicular to the plane of the optical axis 25 and incident light beam 18.

Line segment of light 21 falls on a coded aperture 26 at the front of a coded aperture light detecting means indicated generally at 27 in FIG. 2. The illustrated coded aperture has three coded channels 26-1 to 26-3 each constructed so that the light transmitted through it gives one bit of the digital address of the light spot position. The fourth channel 26-4 is clear and provides a reference light value against which light passing through the other channels is compared. Four light transmitting channels 28-1 to 28-4 are provided and may be a segmented coherent fiber optic bundle, arranged so that the light passing through each channel of the coded aperture is led to a different light detector device 29-1 to 29-4. The latter may be photomultipliers or sensitive, wide dynamic range solid state light detectors. The separate signal outputs are processed to determine if a 0 or 1 light value is detected and these are fed to a computer to calculate a light spot height position.

Figure 4:
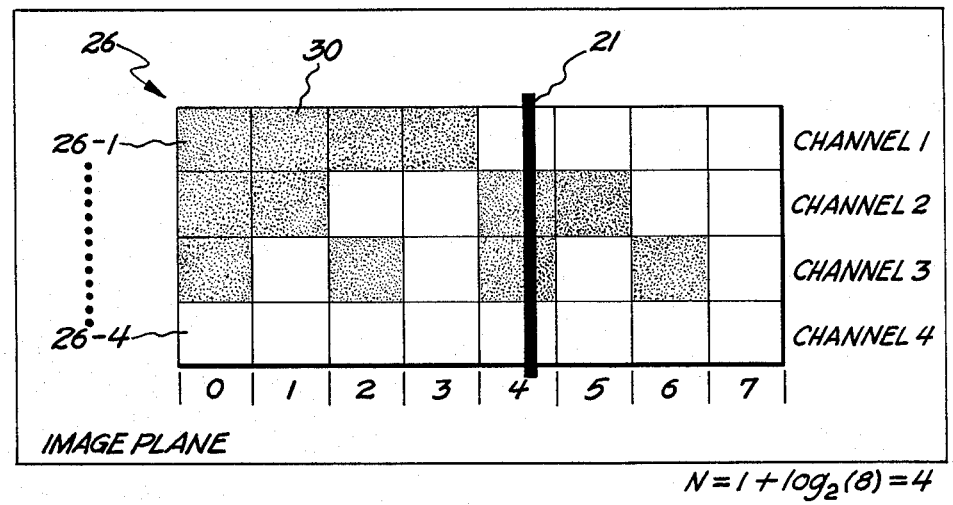
FIG. 4 is an expanded view in the image plane of the light detector's coded aperture.

FIG. 4 is an enlarged view in the image plane of coded aperture 26. There are eight cells per channel and these cells are either opaque or clear, blocking or transmitting light. Channels 1, 2 and 3 are binary coded; the first has four opaque and clear cells, the second two opaque and clear, and so on, and the third alternating opaque and clear cells. For the illustrated position of straight line segment 21 along the coded aperture, the binary coded channels have a "001" readout meaning that the line segment is in column 4. Channel 1 has a high level signal and the other two channels low level signals; the fourth is needed to determine the overall light level against which the three signal channels must be compared. In general, higher resolution can be obtained by adding more finely divided code channels; for a resolution of R separate points, the number N of channels needed is:

$$N = 1 + \log_2 R.$$

Where $R = 8$ resolved points, then $N = 4$ detector channels are needed. As another example, if $R = 256$ resolved points, $N = 9$ detector channels. In practice, a few more channels may be used to provide checks on the signal.

This illustration has utilized a simple coded aperture based on only two levels of light transmission-clear and opaque. However, three or more levels can also be used, reducing the number of detector channels needed for a given resolution. Refer to U.S. Pat. No. 4,687,325 to Corby, for a fuller explanation. Furthermore, a coded aperture consisting of density wedges, changing smoothly from clear to weakly transmitting over several different frequencies can be employed and may offer certain advantages with regard to minimization of the number of channels needed for low data rate ranging.

Figure 5:
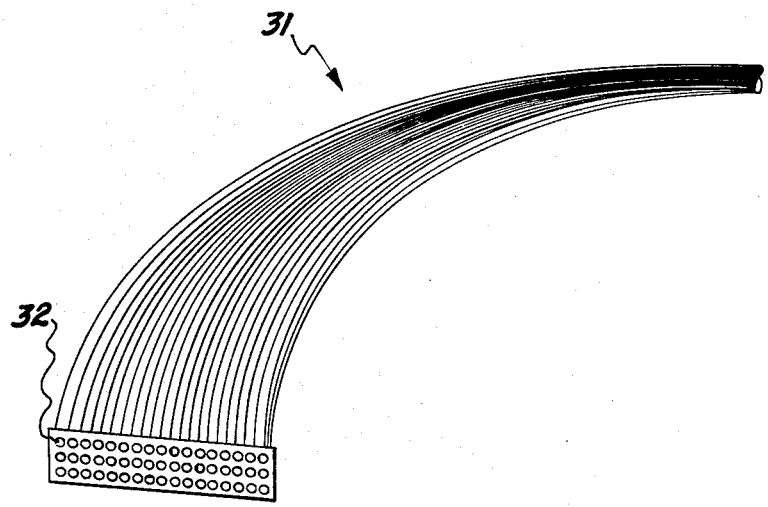
FIG. 5 shows a single channel of a noncoherent fiber optic bundle.
Figure 6:
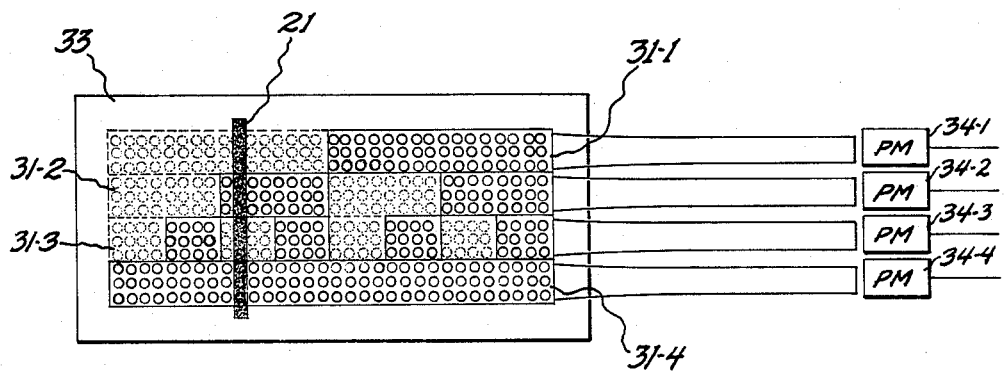
FIG. 6 is plan view in the image plane of a coded aperture detector built with noncoherent fiber optic bundles and a coded ask, each channel routed to a separate photomultiplier.

One fiber optic light transmitting channel 31 is seen in FIG. 5. The noncoherent bundle of fiber optics 32 is rectangular at the coded aperture end and is gathered together and has a circular cross-section at the other end where light is coupled to a detector device. Typical dimensions are that the channel at the front is one inch long and a few mils in width. FIG. 6 shows four such stacked noncoherent fiber optic bundles 31-1 to 31-4 and, at the front of the bundles, a patterned mask 33 which provides the coded aperture. It is seen that the four channels of the coded aperture have clear and opaque cells as in FIG. 4. The address data provided by the photomultiplier tube detectors 34-1 to 34-4 viewing the linear light stripes of code provide the digital address of the position of light stripe 21 along a coordinate perpendicular to its length. This information is provided instantaneously, in parallel. There are no formidable barriers preventing operation of this type of system up to data rates approaching the maximum response frequency of typical photomultiplier detectors (on the order of 100 MHz). Although photomultipliers have ideal light detection qualities, i.e. sensitivity and dynamic range, they are relatively large and require light piping from the coded aperture to each detector and individual high voltage supplies and preamplifiers Therefore, a solid state detector which can perform the same function is desirable. Recently solid state arrays having improved sensitivity and dynamic range have been developed; another good choice is certain types of photodiodes.

Figure 7:
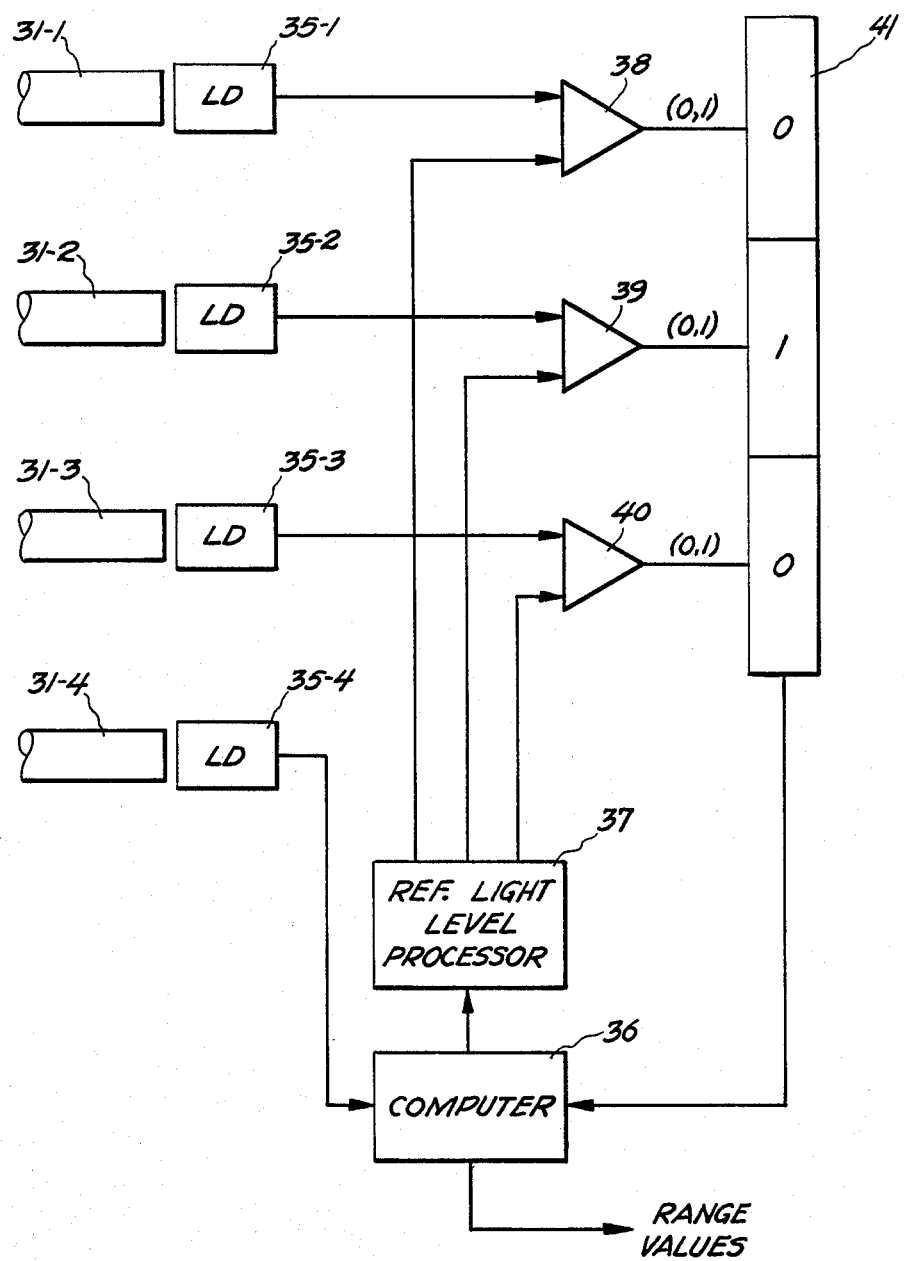
FIG. 7 is a simplified diagram of a circuit to convert detected light signals into a digital number representing the position of a light spot and hence into range values.

The processing of the separate detector signals and computation of range values is illustrated in FIG. 7. The signal produced by reference channel light detector 35-4 is fed to a vision computer 36 and hence to a reference light level processor 37. The reference voltages change as the ambient light level changes and are one input to comparators 38-4 and the other inputs are respectively the signals generated by the coded channel light detectors 35-1 to 35-3. The detectors 35-1 to 35-4 are suitably either photomultipliers or photodiodes. Depending on whether the channel detector signal is above or below the reference, the comparator outputs are 1 or 0. These are presented to the digital address register 41 which, by way of example, shows "010" which signifies that the line segment of light 21 in FIG. 6 is incident on column "2". This digital address is read out to computer 36 where the light spot range or height position is calculated and these values are the system outputs. As the light beam is scanned over the surface whose height is measured, a series of range values are produced at high speed.

One of the important advantages of this improved triangulation ranging system is that it allows verification of the presence of a point of light indicating a range measurement, and determination of the position of this point even in the presence of diffuse background radiation. For example, suppose only diffuse background radiation is present. Then, as reference to FIG. 2 will indicate, the all-clear reference channel 26-4 will have a signal that is precisely twice that of each other coded channel 26-1 to 26-3 (half the cells are opaque). Conversely, if only a single line segment of illumination is used by the detector, each channel will indicate either a zero signal or one equal to the all-clear reference channel value. If two line segments or linear stripes of Illumination are present and of equal magnitude, such as might occur if secondary reflection from the observed surface created an interfering signal, then the reference channel would again indicate a signal twice that of each other channel. One possible confusing situation might arise if a single line segment straddled the demarcation between bright and dark stripes (opaque and clear cells) on the highest resolution code strip. One effective way to resolve this confusion is to include one additional high resolution channel with cells offset in quadrature; i.e., by one-quarter of a cycle. This channel would give a full signal if the other high resolution channel is straddled. Alternatively, the channel coding can be changed from simple binary to a Gray code in which each channel is shifted by 90 spatial degrees such that clear-opaque boundaries do not line up.

These comments illustrate that the separate channel signals can be subjected to simple tests, which can be implemented in high speed analog or digital signal processing, to determine the binary address of the range or height of a light stripe, and to determine the presence of an interfering signal or the absence of any predominant signal, e.g. diffuse background or no light returned as from a hole. These are essential capabilities for a "smart" triangulation ranger. At least some of these signal processing procedures for signal verification are described in the technical paper "High-Speed Triangulation-Based 3-D Imaging with Orthonormal Data Projections and Error Projections", D. D. Harrison and M. P. Weir, submitted to IEEE Transactions on Pattern Analysis and Machine Intelligence (SPIE) Vol 901 Image Processing, Analysis, Measurement, and Quality, 1988, is the same).

Background light and secondary reflections from the surface can interfere with correct interpretation of range from the triangulation signals and a correct measurement of range and height. Most of this undesirable light can be filtered out optically by the addition of a narrow slit aperture to the triangulation ranging system as shown in FIG. 8. Light scattered from circular light spot A at surface position 2 is first focused to spot by a lens 43 onto a slit aperture 44 in an aperture plate 45 which is oriented along the plane of triangulation, the plane defined by the axis of the projecting and receiving optics. The light spot A' passing through this slit 44 is then refocused into line segment A" using an optical system 46 comprised of the combination of two spherical lenses 47 and 48 and a cylindrical lenticular plate 49. Line segment A" falls on the plane of coded aperture 26 illustrated diagramatically at 50. Light spot B at surface position 1 (see also FIG. 1) is imaged as light spot B' that passes through slit aperture 44 before being spread by optical system 46 into line segment B". Unwanted secondary reflections are blocked by aperture plate 45. Thus the secondary reflection A-SR of light spot A is focused by lens 43 as spot A'-SR which does not fall on the slit aperture. In the absence of the modification just described, optical system 46 would spread the secondary reflection of spot A into the light stripe A"-SR. This spurious light stripe could cause problems in interpreting the detector signals.

In conclusion, a high speed, sensitive, wide dynamic range coded aperture light detector and improved range camera are provided by this invention. Exemplary applications are inspecting a loaded printed wiring board and an integrated circuit package, whose complexity is expected to be such that inspection and test will have to be highly automated in order to attain the required yields with the required reliability. Another is the measurement and inspection of mechanical parts and assemblies with significant three dimensionality.

While the invention has been particularly shown and described with reference to preferred embodiments thereof, it will be understood by those skilled in the art that the foregoing and other changes in form and details may be made without departing from the spirit and scope of the invention as defined in the appended claims.

The invention claimed is:

1. A triangulation ranging system comprising:

means to project onto a coded aperture light detecting means a line segment of light whose position along a coded aperture is related to range to an object surface;

said light detecting means having a plurality of coded channels which transmit light to separate detectors and said coded aperture at the front of said channels providing a digital representation of the position of said line segment;

wherein each coded channel ha a row of opaque and clear cells and said light detecting mean also has a clear reference light value channel, the number N of channels to yield a resolution of R range points being given by $N = 1 + \log_2 R$; and said channels are comprised of noncoherent fiber optic bundles, a patterned mask in front of said bundles serving as said coded aperture.

2. An improved triangulation ranging system comprising:

means to project a light beam onto a surface of an object;

an optical system to spread a spot of light scattered from said surface into a line segment that is incident on all channels of a coded aperture light detector at a position therealong related to range to said surface;

said coded aperture light detector comprised of a plurality of binary coded channels and a clear reference channel which are each formed of a noncoherent fiber optic bundle and transmit light to separate photodetectors, and a patterned mask in front of ends of said fiber optic bundles to serve as a coded aperture and block and pass light;

said coded channels each contributing one bit of a digital address of a range position and said reference channel providing a reference light value against which light passing through said coded channels is compared.

3. The ranging system of claim 2 wherein said photodetectors are photomultipliers.

4. The ranging system of claim 2 further including means to filter out background and secondary reflections of light that may interface with a correct measurement of range, comprised of a lens to focus the spot of light scattered from said surface into a second light spot that passes through a slit aperture before being spread by said optical system into said line segment.

5. The ranging system of claim 4 wherein said optical system is a combination of spherical and cylindrical lenses.

6. The ranging system of claim 4 wherein said optical system is a combination of spherical lenses and a cylindrical lenticular plate.

* * * * *